United States Patent
Heyd et al.

(10) Patent No.: US 12,148,322 B2
(45) Date of Patent: Nov. 19, 2024

(54) HEAD TRACKING WITH VIRTUAL AVIONICS TRAINING PRODUCTS

(71) Applicant: Rockwell Collins, Inc., Cedar Rapids, IA (US)

(72) Inventors: Paul Heyd, Marion, IA (US); Spencer Owen, Lisbon, IA (US); Vincent Loschiavo, Cedar Rapids, IA (US)

(73) Assignee: Rockwell Collins, inc., Cedar Rapids, IA (US)

( * ) Notice: Subject to any disclaimer, the term of this patent is extended or adjusted under 35 U.S.C. 154(b) by 451 days.

(21) Appl. No.: 17/232,375

(22) Filed: Apr. 16, 2021

(65) Prior Publication Data

US 2021/0327295 A1    Oct. 21, 2021

Related U.S. Application Data

(60) Provisional application No. 63/011,848, filed on Apr. 17, 2020.

(51) Int. Cl.
*G09B 9/30* (2006.01)
*G06F 3/01* (2006.01)
(Continued)

(52) U.S. Cl.
CPC ............. *G09B 9/302* (2013.01); *G06F 3/012* (2013.01); *G06F 3/016* (2013.01);
(Continued)

(58) Field of Classification Search
CPC ......... G09B 9/302; G09B 9/307; G06F 3/012; G06F 3/016; G06F 3/04815;
(Continued)

(56) References Cited

U.S. PATENT DOCUMENTS 7,385,684 B2    6/2008 Young et al.
7,871,270 B2    1/2011 Seeliger et al.
(Continued)

FOREIGN PATENT DOCUMENTS

CN    107154197 A  *  9/2017

OTHER PUBLICATIONS

Baudisch, et al., High-density cursor: a visualization technique that helps users keep track of fast-moving mouse cursors, <URL=https://www.microsoft.com/en-us/research/publication/high-density-cursor-a-visualization-technique-that-helps-users-keep-track-of-fast-moving-mouse-cursors/> (Year: 2013).*

(Continued)

*Primary Examiner* — James T Tsai
(74) *Attorney, Agent, or Firm* — Suiter Swantz IP (57) ABSTRACT

A simulator is disclosed. The simulator includes a display configured to display a 3D simulated environment and a tracking system configured to track a target. The tracking system also includes a projection configured to illuminate the target and a sensor configured to obtain a depth-image of the target. The tracking system also includes a processor configured to determine the distance of the target and/or an angle of the face of a target from the tracking system and/or display. The simulator also includes a computing unit communicatively coupled to the display and the tracking system. The computing unit is configured to send the 3D simulated environment signal to the display and to perform an adjustment of the 3D simulated environment based on at least one of the distance of the target or an angle of a face of the target relative to at least one of the display or tracking system.

8 Claims, 5 Drawing Sheets

(51) Int. Cl.
*G06F 3/04815* (2022.01)
*G06F 3/0488* (2022.01)
*G06T 7/521* (2017.01)

(52) U.S. Cl.
CPC ........ *G06F 3/04815* (2013.01); *G06F 3/0488* (2013.01); *G06T 7/521* (2017.01); *G09B 9/307* (2013.01); *G06T 2207/10028* (2013.01); *G06T 2207/10048* (2013.01); *G06T 2207/30201* (2013.01)

(58) Field of Classification Search
CPC ............... G06F 3/0488; G06T 7/521; G06T 2207/10028; G06T 2207/10048; G06T 2207/30201; G06T 2207/10016; G06T 7/251
See application file for complete search history.

(56) References Cited

U.S. PATENT DOCUMENTS

| | | |
|---|---|---|
| 7,883,415 B2 | 2/2011 | Larsen et al. |
| 8,144,148 B2 | 3/2012 | Dokor et al. |
| 9,201,501 B2 | 12/2015 | Maizels et al. |
| 9,377,863 B2 | 6/2016 | Bychkov et al. |
| 9,454,225 B2 | 9/2016 | Bychkov et al. |
| 10,114,455 B2 | 10/2018 | Cheng et al. |
| 10,345,768 B2 * | 7/2019 | Fullam ............... G09G 3/00 |
| 2006/0114171 A1 | 6/2006 | Vascotto et al. |
| 2011/0183301 A1 * | 7/2011 | Turner ............... G09B 9/302 434/43 |
| 2014/0361957 A1 * | 12/2014 | Hua ............... G02B 27/0172 345/8 |
| 2015/0310758 A1 | 10/2015 | Daddona et al. |
| 2016/0202770 A1 | 7/2016 | Hegde |
| 2016/0317930 A1 | 11/2016 | Nakayama |
| 2019/0325648 A1 * | 10/2019 | Hollis ............... G06T 19/003 |
| 2019/0355272 A1 * | 11/2019 | Nusbaum ............... G09B 9/42 |
| 2022/0214743 A1 * | 7/2022 | Dascola ............... G06F 3/017 |

OTHER PUBLICATIONS

URL: https://www.youtube.com/watch?v=89AnFISP7k4, Downloaded Jan. 27, 2020.

* cited by examiner

FIG.5

HEAD TRACKING WITH VIRTUAL AVIONICS TRAINING PRODUCTS

PRIORITY

The present application claims the benefit under 35 U.S.C. § 119(e) of U.S. Provisional App. No. 63/011,848 (filed Apr. 17, 2020), which is incorporated herein by reference in its entirety.

BACKGROUND

Simulators are devices used to train drivers of moving vehicles, such as aircraft, ships, and automobiles. Simulators typically emulate the environment of the operator within the vehicle. For example, a simulator for an aircraft may emulate one or more instrument panels of cockpit. Simulators are typically highly complicated and expensive to build. Simulators are typically manufactured for a single type, make or model of a device, and may be difficult to impossible to alter in order to simulate a vehicle of a different type or model. Thus, it is desirable to provide a product that avoids the shortcomings of conventional approaches.

SUMMARY

A simulator is disclosed. In one or more embodiments, the simulator includes a display configured to display a 3D simulated environment. In some embodiments, the simulator further includes a tracking system configured to track a target. In some embodiments, the tracking system includes a projector configured to illuminate the target. In some embodiments, the tracking system includes a sensor configured to obtain a depth-image of the target. In some embodiments, the tracking system includes a sensor. In some embodiments the sensor is configured to determine the distance of the target relative to at least one of the display or tracking system. In one or more embodiments, the simulator further includes one or more processors. In one or more embodiments, the simulator further includes a memory communicatively coupled to the one or more processors and having instructions stored upon, which when executed by the one or more processors, cause the one or more processors to determine an angle of a face of the target relative to at least one of the display or tracking system. In some embodiments, the simulator includes a computing unit communicatively coupled to the display and the tracking system. In some embodiments, the computing unit is configured to send the 3D simulated environment signal to the display. In some embodiments, the computing unit is configured to perform an adjustment of the 3D simulated environment based on at least one of the distance of the target or an angle of a face of the target relative to at least one of the display or tracking system.

In some embodiments of the simulator, the 3D simulated environment is configured to be a global adjustment.

In some embodiments of the simulator, the adjustment of the 3D display is configured to be an adjustment of a virtualized component within the 3D simulated environment.

In some embodiments of the simulator, the virtualized component is configured as an instrument.

In some embodiments of the simulator, the display is configured as a touch sensitive display, wherein the instrument is operated via a touch upon the touch sensitive display.

In some embodiments of the simulator, the instrument is configured as an avionic instrument panel.

In some embodiments of the simulator, the instrument is configured as a floor instrument.

In some embodiments of the simulator, the instrument is configured as a throttle quadrant.

In some embodiments of the simulator, the adjustment of the virtualized component is transiently tracked on the display.

In some embodiments of the simulator, the display is further configured to switch between the 3D simulated environment and at least one of a 2D simulated environment or a static 3D simulated environment, wherein an adjustment of the 3D simulated environment based on at least one of the distance of the target or the angle of the face of the target relative to at least one of the display or tracking system is not performed.

In some embodiments the simulator is further configured to operate in an absence of the tracking system.

In some embodiments the simulator further includes a haptic device.

In some embodiments of the simulator, the display is further configured as a head-mounted display.

In some embodiments, the simulator further includes a head-mounted display.

In some embodiments of the simulator, the sensor further comprises an infrared camera.

In some embodiments of the simulator, the target further comprises a head tracking device.

In some embodiments the simulator further includes a non-virtual instrument.

In some embodiments of the simulator, the display is further configured to present a virtualized window-view of a vehicle.

In some embodiments, of the simulator, the simulator further includes a seat.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a simulator for training vehicle drivers. Traditional approaches for driving simulators include the creation of instrument panels emulating the instrument panel of a vehicle built around the driver compartment (e.g., the driver's seat or cockpit). These simulators often included physically manipulated switches, knobs, levers, and other instrumentation relevant to the vehicle. While effective in simulating a driver environment, simulators may be prohibitively expensive, particularly in highly complex environments, such as a fighter aircraft or commercial airliner. The expense of the simulator may limit the number of simulators that are built, which may reduce the number of people that can undergo training in the simulator. Traditional simulators may also be limited to a single type, model, or make of a vehicle. For example, a simulator for a Boeing 737 may not be suitable for training a pilot for a Boeing 777. The cost of modifying a simulator, such as a Boeing 737 to a Boeing 777 simulator may be cost prohibitive as well.

In embodiments of this disclosure, a simulator 100 is disclosed with one or more displays that emulate in 3D an instrument panel of a vehicle. The simulator has a sensor that can sense the movements of the user and can adjust the view of the 3D display based on the distance or angle of the head of the user to the 3D display. Furthermore, the simulator allows a user to operate a virtual instrument on the instrument panel of the 3D display by manipulating the virtual instrument by hand within the vicinity of the 3D image.

Figure 1:
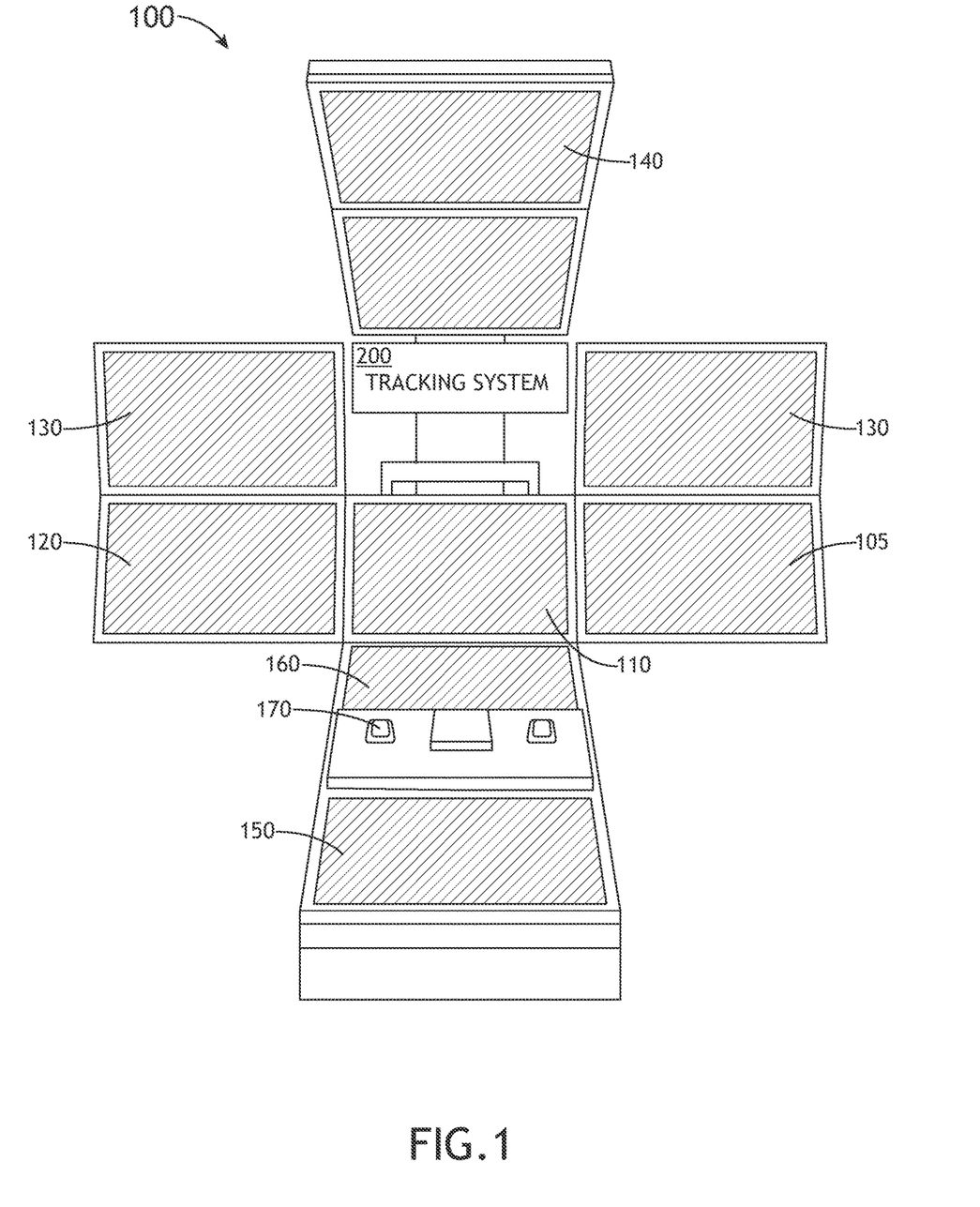
FIG. 1 illustrates an example embodiment of a simulator, in accordance with one or more embodiments of the disclosure.

FIG. 1 illustrates an example embodiment of the simulator 100, in accordance with one or more embodiments of the disclosure. In some embodiments, the simulator 100 includes one or more displays 105 for displaying data from the simulator. For example, the one or more displays may include a main instrument panel display 110. The main instrument panel display 110 displays the instruments of the simulator 100. In some embodiments, the simulator includes more than one instrument panel display 110. For example, a simulator for an aircraft may have one instrument panel display 110, and a second instrument panel display 110 for the copilot. In some embodiments, only one instrument panel display 110 is used.

Other displays may also be included in the simulator 100. For example, the simulator may further include a central instrument panel display 120. For example, the central instrument panel display 120 for aircraft simulator 100 may contain virtualized instruments that may be accessed by either the pilot or copilot (e.g., as in FIG. 1). For instance, the display 105 may simulate an avionic instrument panel.

In some embodiments, the simulator 100 may further include a ceiling instrument panel display 140. For example, the ceiling instrument panel display 140 may include virtualized instruments (e.g., toggle switches) normally found on the ceiling of a cockpit (e.g., internal lights or environmental controls).

In some embodiments, the simulator 100 may further include a floor instrument panel display 150. For example, the floor panel display 150 may include virtualized instruments (e.g., levers) normally found on the floor or floor-attached console of a cockpit (e.g., a throttle quadrant).

In some embodiments, the simulator 100 may further include an external environment display 160. The external environment display 160 is configured to give the trainee a simulated view of a window of the vehicle (e.g., a virtualized window-view of a vehicle). For example, the external environment display 160 may display a high-altitude virtual environment for an aircraft simulator 100 simulating a high-altitude flight. In some embodiments, the external environment display 160 additionally displays details from an augmented-system. For example, some aircraft have augmented reality system that allow data to be displayed on a window, a helmet visor, or some other screen. The external environment display 160, may replicate the augmented reality signals and cues onto the virtualized window-view of the external environment display. It should be known that the displays may also display virtualized dials, indicators, light, data screens, or other instruments. It should also be known that any display 105 mentioned in this disclosure may refer to any other display (e.g., display 105, 110, 120, 130, 140, 150, or 160) in this disclosure, as all of the displays serve the function of delivering data to a trainee. For example, the data and imagery viewed on the external environmental display 160 may be viewed on the ceiling instrument panel display 140. Therefore, the above description should not be interpreted as a limitation of the present disclosure, but merely as a limitation.

In some embodiments, the simulator contains one or more non-virtualized instrument 170. For example, the non-virtualized may be a facsimile of an instrument commonly found in an aircraft cockpit. For instance, the non-virtualized instrument may be throttle quadrant. A simulator 100 may contain any mix of virtualized instruments and non-virtualized instruments. The simulator 100 may also have both virtualized and non-virtualized versions of the same instrument. For example, a simulator may have virtualized and non-virtualized versions of a throttle quadrant to assess the trainee's ability to use either instrument and/or assess the ability of the virtualized throttle quadrant to emulate the non-virtualized throttle quadrant.

Figure 2:
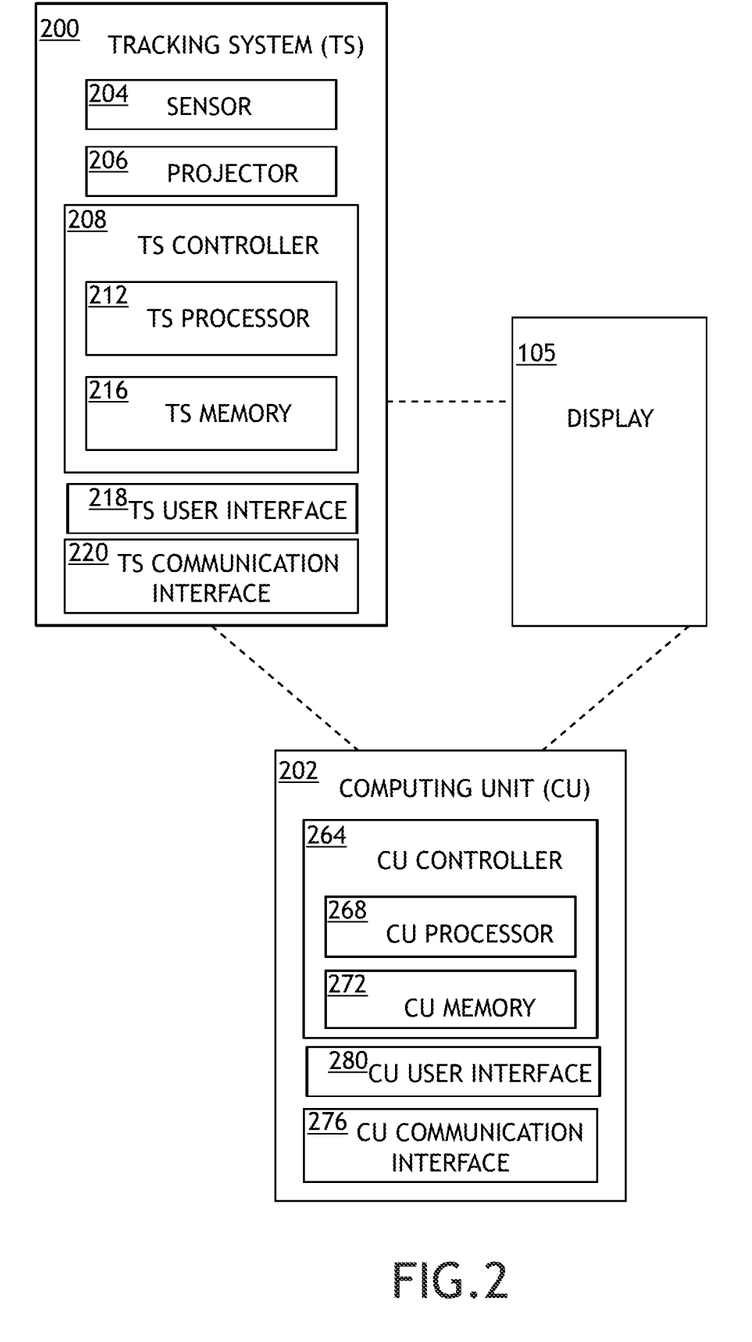
FIG. 2 is a block diagram illustrating the components of the simulator, in accordance with one or more embodiments of the disclosure.

In some embodiments, the simulator contains a tracking system 200. The tracking system identifies a target (e.g., the trainee) and tracks the position or movement of the target and/or a portion of the target during the simulation. For example, the tracking system 200 may be configured to determine the distance from the target to the tracking system 200. In another example, the tracking system may be configured to determine the angle of a face of target to the tracking system 200 (e.g., by determining the distance of two or more points on the face of the target to the tracking system 200. In some embodiments, the tracking system 200 determines the distance of the target and/or the angle of a face of the target to the one or displays 105. For example, the tracking system 200 may determine the distance of one or more fingers of a trainee from a portion of the central instrument panel display 120 that is displaying a knob. The tracking system may include a commercial off the shelf (COTS) tracking system, such as the Kinect™ device vended by Microsoft. The tracking system may also be a non-COTS tracking system. FIG. 2 is a block diagram illustrating the components of the simulator 100, in accordance with one or more embodiments of the disclosure, which includes the tracking system 200, the one or more displays 105, and a computing unit 202.

In some embodiments the tracking system includes a sensor 204. The sensor 204 is configured to scan for a target (e.g., a trainee) and take a depth-image of the target. A depth-image is an image that contains information relating to the distance of scene objects from a view point. For example, the sensor 204 may create a depth-image of a face of the trainee. In another example, the sensor 204 may create a depth-image of a hand of the trainee. In another example, the sensor 204 may create a depth-image of the whole body of the trainee. The sensor 204 may create depth-images of any parts or any combination of parts of the trainee or other targets. Therefore, the above description should not be interpreted as a limitation of the present disclosure, but merely an illustration.

In some embodiments, the tracking system 200 further includes a projector 206. The projector 206 sends out an electromagnetic signal that illuminates the target. A portion of the electromagnetic signal is then detected by the sensor 204 and is used to create a depth-image. The projector 206 may use any portion or band of the electromagnetic signal known in the art. For example, the projector may project an infrared signal that is then detected by a sensor (e.g., an infrared camera). In another example, the projector may project an ultraviolet signal.

In some embodiments, the tracking system 200 includes one or more tracking system (TS) controllers 208. The one or more TS controllers 208 may be housed within the tracking system 200. The one or more TS controllers 208 may also be housed within the computing unit 202. The one or more TS controllers 208 may be configured to communicate with the projector 206 and sensor 204, a tracking system (TS) user interface 218 and/or a tracking system (TS) communication interface 220. The one or more TS controllers 208 may include one or more tracking system (TS) processors 212 and tracking system (TS) memory 216. The TS memory 216 may store one or more sets of program instructions. The one or more TS processors 212 may be configured to execute the one or more sets of program instructions to carry out one or more functions described throughout the present disclosure.

The one or more TS controllers 208 may be coupled (e.g., physically and/or communicatively coupled) to the one or more displays 105, the computing unit 202, a non-virtualized instrument 170, or any component of the tracking system 200 or computing unit 202. For example, one or more signals may be transmitted and/or received between the one or more TS controllers 208 and the one or more displays 105. For instance, the movement of a target (e.g., the head of a trainee) towards a virtualized instrument panel on one or more displays 105 may be detected by the sensor, which then may invoke the TS controller 208 to send a signal to the one or more displays 105 to make the image of the virtual instrument panel larger.

The one or more TS communication interfaces 220 may be operatively configured to communicate with components of the one or more TS controllers 208. For example, the one or more TS communication interfaces 220 may be configured to retrieve data from the one or more TS processors 212 or other devices, transmit data for storage in the TS memory 216, retrieve data from storage in the TS memory 216, and so forth. The one or more TS communication interfaces 220 may also be communicatively coupled with the one or more TS processors 212 to facilitate data transfer between components of the one or more TS controllers 208 and the one or more TS processors 212. It should be noted that while the one or more TS communication interfaces 220 is described as a component of the one or more TS controllers 208, one or more components of the one or more TS communication interfaces 220 may be implemented as external components communicatively coupled to the one or more TS controllers 208 via a wired and/or wireless connection. The one or more TS controllers 208 may also include and/or connect to one or more TS user interfaces 218 (e.g., input/output (I/O) devices). In embodiments, the one or more TS communication interfaces 220 includes or is coupled to the sensor 204, projector 206, the TS user interface 218, or any combination thereof. In embodiments, the one or more tracking system communication system may be coupled to the display 105 or the computing unit 202.

The one or more TS communication interfaces 220 may be operatively configured to communicate with the one or more TS user interfaces 218. The one or more TS controllers 208 and the one or more TS user interfaces 218 may be separate components (e.g., have separate housings and/or separate chassis). It is noted herein, however, that the one or more TS controllers 208 and the one or more TS user interfaces 218 may be components integrated in a single housing and/or on a single chassis.

The computation unit 202 of the simulator 100 provides processes the graphical images of the virtual components of the simulator 100, where they are then transmitted to the one or displays 105. The computation unit 202 receives data input from the tracking system 200 and/or the non-virtualized instrument 170 and modifies the graphical image signal sent to the display depending on the received data input. For example, if the tracking system 200 detects that a finger from the hand of the trainee is approaching the portion of the central instrument panel display 120 where there is a push button, the tracking system 200 will send that data to the computation unit 202. The computation unit 202 may then alter the image data so that the central instrument panel display 120 will display the push button as being pushed. In some embodiments, the computation unit is a COTS computer (e.g., a personal computer or a video gaming device). In some embodiments, the computation unit is a non-COTS device. By way of one example, the computation unit 202, and the tracking system 200 are a self-contained device (e.g., all in one housing). In another example, the computation unit 202 and the tracking system are separate, communicatively-coupled devices.

The computation unit 202 of the simulator may include one or more computation unit (CU) controllers 264. The one or more CU controllers 264 may include one or more computation unit (CU) processors 268, computation unit (CU) memory 272, computation unit (CU) communication interfaces 278 and a computation unit (CU) user interface 280. The CU memory 272 may store one or more program instructions. The one or more CU processors 268 may be configured to execute the one or more sets of program instructions to carry out one of more of the various steps described throughout the present disclosure.

The one or more TS processors 212 and/or CS processors 268 provide processing functionality for at least the one or more TS controllers 208 and/or CU controllers 264, and may include any one or more processing elements known in the art including but not limited to micro-controllers, circuitry, field programmable gate array (FPGA) or other processing systems, and resident or external memory for storing data, executable code, and other information accessed or generated by the one or more TS controllers 208 and/or CU controllers 264. The one or more TS processors 212 and/or CS processors 268 may execute one or more software programs (e.g., the one or more sets of program instructions) embodied in a non-transitory computer readable medium (e.g., the TS memory 216 and/or CU memory 272) that implement techniques described herein. The one or more TS processors 212 and/or CS processors 268 are not limited by the materials from which it is formed or the processing mechanisms employed therein and, as such, may be implemented via semiconductor(s) and/or transistors (e.g., using electronic integrated circuit (IC) components), and so forth.

The TS memory 216 and/or CU memory 272 may be an example of tangible, computer-readable storage medium that provides storage functionality to store various data and/or program code associated with operation of the one or more TS controllers 208 and/or CU controllers 264 was well as the one or more TS processors 212 and/or CS processors 268, such as software programs and/or code segments, or other data to instruct the one or more TS processors 212 and/or CS processors 268 and/or other components of the one or more TS controllers 208 and/or CU controllers 264, to perform the functionality described herein. Thus, the TS memory 216 and/or CU memory 272 may store data, such as a program of instructions for operating the one or more TS controllers 208 and/or CU controllers 264, including its components (e.g., one or more TS processors 212 and/or CS processors 268 the one or more TS communication interfaces 220 and/or CU communication interfaces 278, or the like), and so forth. It should be noted that while a single memory is described, a wide variety of types and combinations of memory (e.g., tangible, non-transitory memory) may be employed. The TS memory 216 and/or CU memory 272 may be integral with the one or more TS processors 212 and/or CS processors 268, may include stand-alone memory, or may be a combination of both. Some examples of the TS memory 216 and/or CU memory 272 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more TS controllers 208 and/or CU controllers 264 may be configured to receive and/or acquire data or information from other systems or tools via the one or more communication interfaces 220, 276 that may include wireline and/or wireless portions. In addition, the one or more TS controllers 208 and/or CU controllers 264 may be configured to transmit data or information (e.g., the output of one or more procedures of the inventive concepts disclosed herein) to one or more systems or tools via the one or more TS communication interfaces 220 and/or CU communication interfaces 278 that may include wireline and/or wireless portions. In this regard, the transmission medium may serve as a data link between the one or more TS controllers 208 and/or CU controllers 264, and/or other subsystems. In addition, the one or more TS controllers 208 and/or CU controllers 264 may be configured to send data to external systems via a transmission medium (e.g., network connection).

It is noted herein that the tracking system 200 may be considered to be at least a portion of the one or computing unit 260. For example, the tracking system 200 may be a component of the computing unit 260. By way of another example, tracking system 200 may be integrated within the one or more computing units 260. In addition, it is noted herein that the tracking system 200 may be considered to include and/or be a computing unit, for purposes of the present disclosure.

The one or more displays 105 may include any display device known in the art. For example, the one or more displays 105 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user interfaces 218, 280 may include one or more input devices that may include any user input device known in the art. For example, the one or more input devices may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. The input devices may also include any device that emulates a device on an instruments panel or other cockpit instrument. For example, the input device may be a throttle quadrant.

In some embodiments, the one or displays 105 configured to be touch sensitive. In the case of a touchscreen interface, those skilled in the art should recognize that a large number of touchscreen interfaces may be suitable for implementation in the present invention. For instance, the one or more displays 126 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention.

Figure 3:
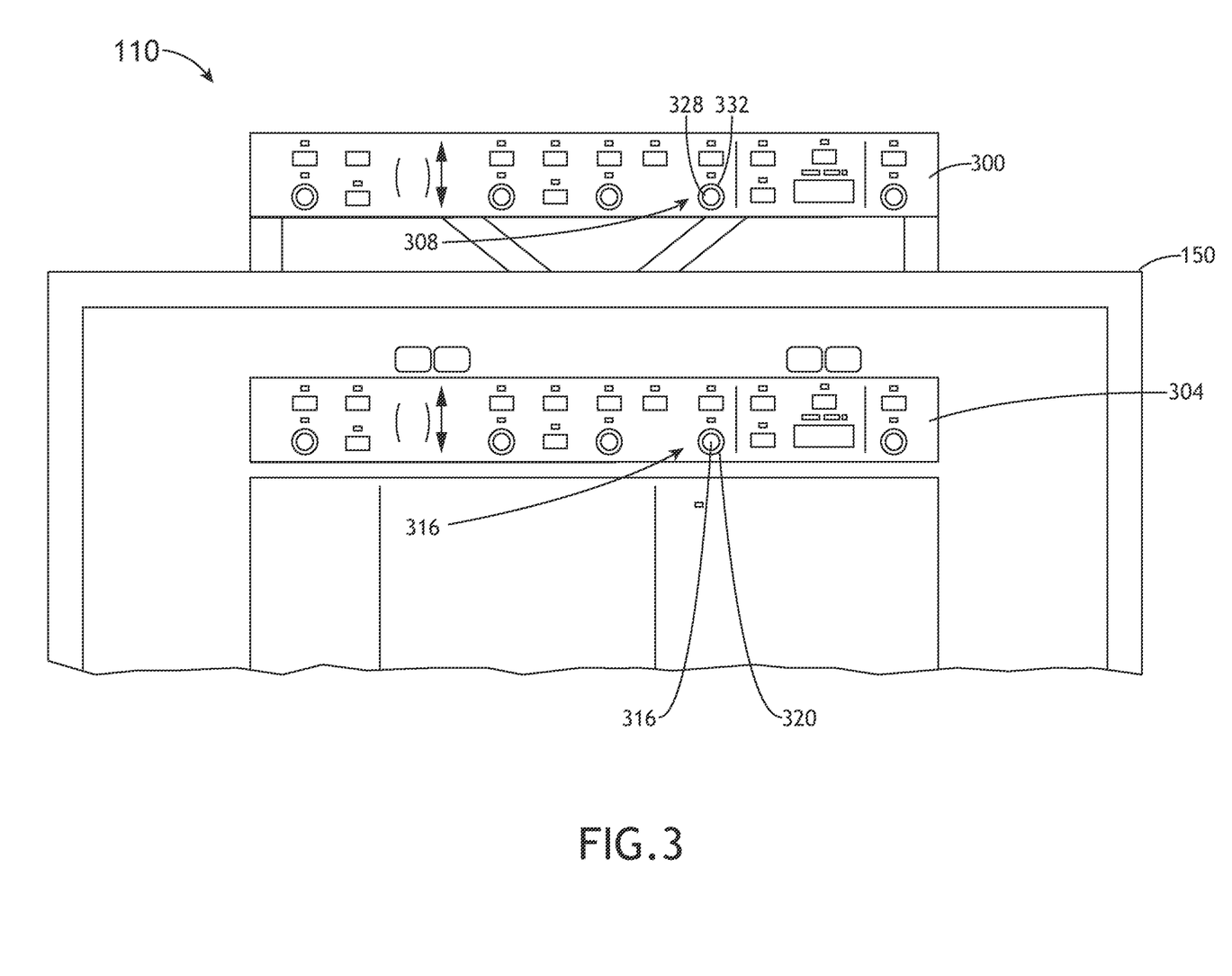
FIG. 3 Illustrates a non-virtualized instrument panel disposed upon the instrument panel display displaying a virtualized instrument panel, in accordance with one or more embodiments of the disclosure

FIG. 3 illustrates a non-virtualized instrument panel 300 disposed upon the instrument panel display 120 displaying a virtualized instrument panel 304, in accordance with one or more embodiments of the disclosure. The non-virtualized instrument panel 300 includes one or more non-virtualized knobs 308 that correspond to one or more virtualized knobs 312 on the virtualized instrument panel 304. For example, one of the non-virtualized knobs 312 includes a concentric stacked non-virtualized knob 316. The concentric stacked virtualized knob 316 is comprised of a large diameter virtualized knob 320 and a smaller virtual secondary knob 324 stacked on top of the virtualized base knob 320. Correspondingly, the concentric stacked non-virtualized knob 308 is comprised of a large diameter non-virtualized knob 328 and a smaller non-virtual secondary knob 332 stacked on top of the virtualized base knob 328. Each knob of the non-virtualized knob 308 can rotate independently of the other when twisted by the trainee. Each knob of the virtualized knob may also be rotated independently of the other when twisted by the trainee. For example, the tracking system 200 may detect that the trainee is attempting to twist the virtualized secondary knob 332, by placing of a thumb and finger proximate to the virtualized secondary knob 332 on the screen, and making a twisting motion. The computing unit 202 may then adjust the image data so that the display will show the virtualized secondary knob 332 being turned. In other words, the actions of manually twisting the non-virtual secondary knob 332 can be replicated in a virtual environment. In this manner, the manipulation of most any instrument or device utilized within a vehicle can be replicated in the simulator 100. It should be known that the inclusion of both the non-virtualized instrument panel 300 and virtualized instrument panel 304 in the simulator was made for demonstration purposed. The simulator 100 may also contain only the non-virtualized instrument panel 300 or the virtualized instrument panel 304. Therefore, the above description should not be interpreted as a limitation of the present disclosure, but merely as an illustration.

Figure 4:
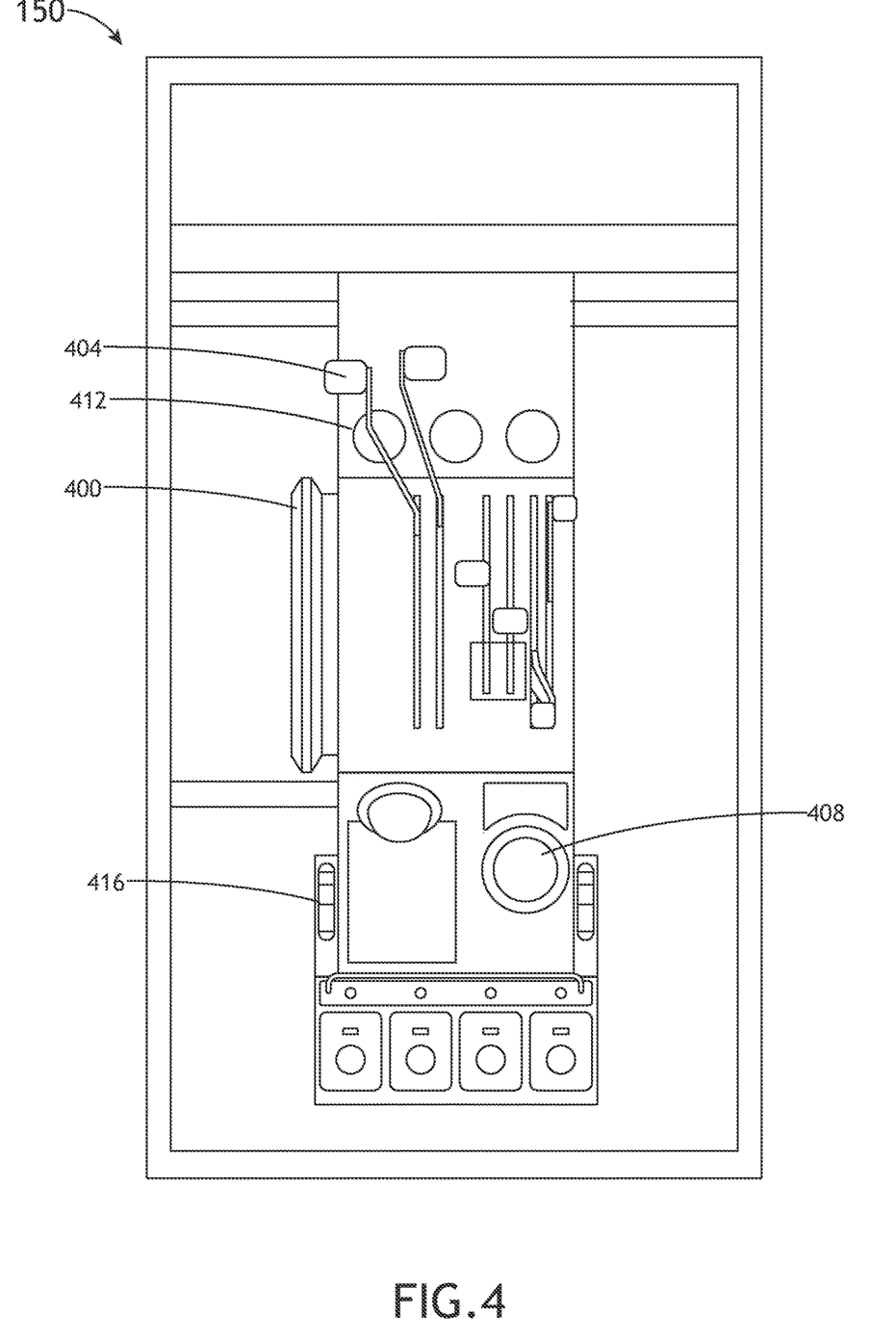
FIG. 4 illustrates a floor instrument panel display demonstrating a virtualized throttle quadrant in accordance with one or more embodiments of the disclosure.

FIG. 4 illustrates a floor instrument panel display 150 demonstrating a virtualized throttle quadrant 400 in accordance with one or more embodiments of the disclosure. The virtualized quadrant may include one or more levers 404, dials 408, gauges 412, switches 416, or other instruments. As described elsewhere herein the tracking system may detect the movement of a hand of the trainee towards one of the instruments of the virtualized throttle quadrant 400 (e.g., one of the levers 404) on the floor instrument panel display 150. When the trainee attempts to grab the lever 404 and move the lever 404 forward, the tracking system 200 detects this motion, sending data to the computation unit 202, which may respond by displaying an animation on the floor instrument panel display 150 of the lever 404 moving forward.

It should be known that an action of the trainee upon a virtualized instrument or non-virtualized instrument may result in a change in the virtual environment of the simulator 100. For example, the adjustment of the lever 404 of the virtualized throttle quadrant 400 may result in the simulator indicating a change in speed. For instance, the change in speed may be represented by a virtual speed indicator on a virtual instrument panel on the one or more displays 105. In another instance, the change in speed may be represented by a change in speed as seen in the external environment display 160 (e.g., the passing of virtual ground landmarks when looking out of a virtual window on the external environmental display).

In some embodiments, the simulator 100 displays an indication of when a virtualize component is moved (e.g., adjustment of the virtualized component is transiently tracked on the display). For example, the adjustment of the lever 404 of the virtualized throttle quadrant may result in an image showing that the lever has been moved. For instance, the simulator 100 may present a thick line on the floor instrument panel display 150 showing that the lever has been moved. This indication assists the trainee in confirming that the lever 404 has been moved in the simulation. In another instance, a dotted line follows the path of the lever 404 on the floor instrument panel display 150. Any mark indicating movement of the virtualized instrument may be used. The indication may be long lasting (e.g., lasting until the end of the simulation), or may last a short amount of time (e.g., five seconds). An indication may be performed for any virtualized instrument in the simulator 100. For example, an indication may be created when a button is pushed, a toggle switch is flipped, or an adjustment of a yoke.

Figure 5:
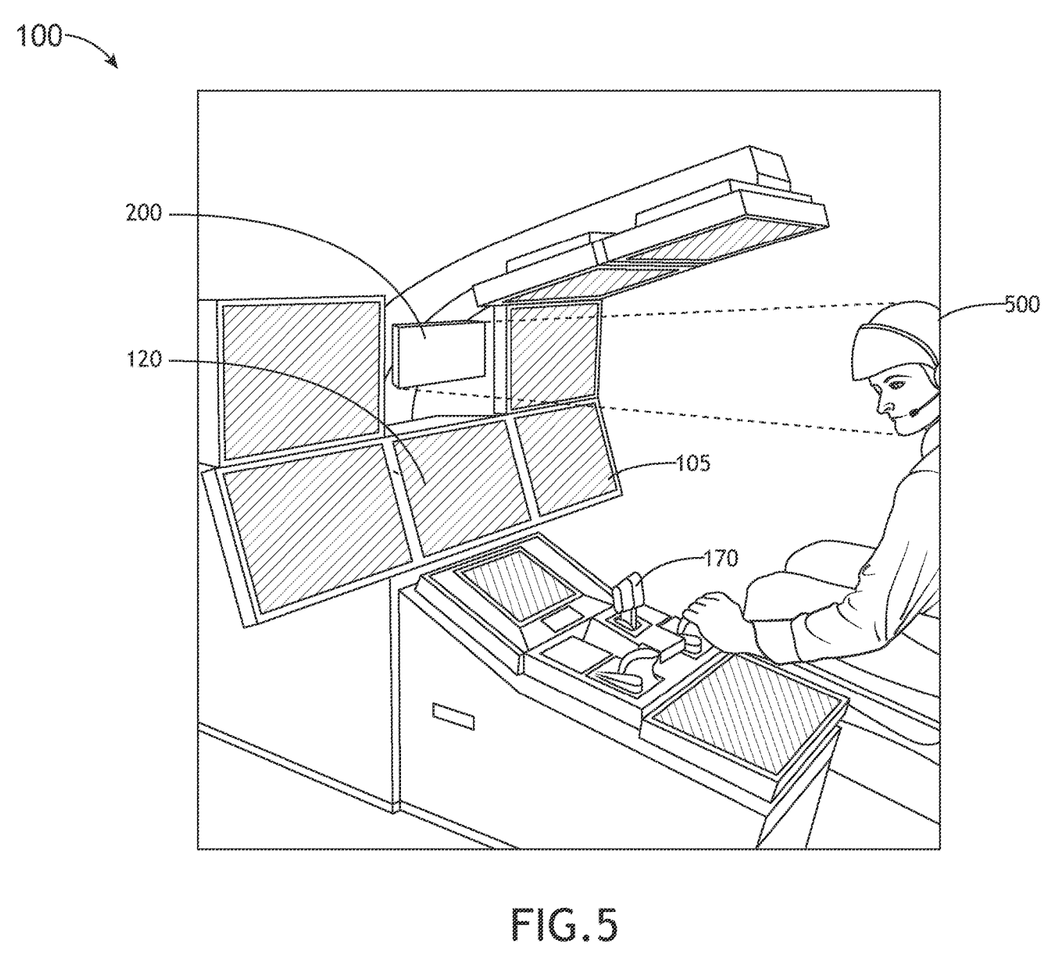
FIG. 5 is an example environment of the simulator with a pilot trainee, in accordance with one or more embodiments of the disclosure.

FIG. 5 is an example environment of the simulator 100 with a pilot trainee 500, in accordance with one or more embodiments of the disclosure. In performing the simulation with the simulator 100, the pilot trainee 500 sits adjacent to the simulator 100 in a position typical for a pilot trainee. The projector 206 of the tracking system 200 sends an electromagnetic signal to the pilot trainee (e.g., infrared signal). Signals that bounce off of the pilot trainee are received by the sensor 204 of the tracking system 200, and is able to recognize one or more parts of the pilot trainee 500 (e.g., the face, the hands). The pilot trainee 500 can physically access the one or more displays 105 of the simulator (e.g., such as the central instrument panel display 120) and may access one or more non-virtualized instruments 170 (e.g., a throttle quadrant). The pilot trainee 500 in FIG. 5 is shown sitting on the right side of the simulator 100. It should be known that many simulators 100 traditionally will have the pilot trainee 500 sitting on the left side of the simulator 100 (e.g., the simulator 100 may include at least one seat). Both left and right configurations of the pilot trainee 500 in relation to the simulator are possible. Therefore, the above description should not be interpreted as a limitation of the present disclosure, but merely as an illustration.

If the movement of the head of the pilot trainee 500 is tracked, one or more displays may be adjusted to reflect the same field of view pilot trainee would have in an actual cockpit. This adjustment is accomplished through a 3D rendering of simulator images (e.g., the displays are configured to display a 3D simulated environment). For example, the simulator may utilize a dynamic 3D rendering that allows a trainee to see between different layers in the rendering, depending on the angle of view. For example, referring to FIG. 4, a pilot trainee 500 having a straight-ahead view of the lever 404 of the virtualized throttle quadrant 400 may have one or more gauges 412 obscured by one or more levers 404. By adjusting the angle and or the distance of the face of the pilot trainee 500 from the virtualized throttle quadrant 400, the simulator 100 may adjust the floor panel display 150 so that the pilot trainee 500 is able to fully see the gauge 412.

In some embodiments, the simulator is further configured to switch between the 3D simulated environment and a 2D simulated environment. For example, a pilot trainee 500 may want or need to run the simulator in a 2D mode (e.g., the current model of aircraft to be simulated is only modeled for 2D). The switch between 3D and 2D rendering can then be made using the user interface 218, 280 on the tracking system 200 or the computing unit 202. In some embodiments, the simulator 100 is further configured to switch between the 3D environment and a static 3D environment, wherein an adjustment of the 3D simulated environment based on at least one of the distance of the target or the angle of the face of the target relative to at least one of the display 105 or tracking system 200 is not performed. For example, the display 105 showing a static 3D environment may show a similar 3D rendering of the controls of the simulator 100 as the 3D environment. However, the static 3D environment will not adjust the 3D image on the display 105 upon movement by the target (e.g., the pilot trainee 500).

In some embodiments, the simulator is configured to operate in the absence of the tracking system 200. For example, the tracking system 200 may be turned off when the simulator is running in a 2D environment. In another example, simulator may be run in a non-dynamic 3D mode, where no adjustment is made to the angle of view of images on the one or more displays 105, and the use of the tracking system 200 is not required.

As described herein, in some embodiments, the adjustment of the 3D simulated environment may be configured to be a global adjustment (e.g., the view of the one more displays shifts upon a change in view of the pilot trainee). In some embodiments, the adjustment is configured to be adjustment of a virtualized component within the 3D simulated environment. For example, in some embodiments, the virtualized component is configured as an instrument. For instance, the instrument is a virtualized throttle quadrant 400.

In some embodiments, the simulator 100 further includes a haptic device. Haptic devices, also known as kinesthetic communication devices or 3D touch devices, utilize force vibrations, or motion to a user to simulate a touch or movement of a virtual device (e.g., such as virtual object in a computer simulation). For example, the haptic device may comprise a glove. For instance, the haptic glove may stimulate a finger when a virtualized toggle switch is switched, with a stimulation that replication the feel of a finger performing the switching act. In another example, the haptic device may include a watch that vibrates when a virtual instrument is moved. The simulator 100 may use any haptic device known in the art.

In some embodiments, the simulator 100 further comprises a head-mounted display (HMD). HMDs are displays worn on the head with a small display disposed in front of one or more eyes. In some embodiments, the screen on an HMD may emulate the one or more displays 105. For example, a pilot trainee 500, wearing an HMD may reach for the virtualized throttle quadrant 400 located on the floor instrument panel display 150. The tracking system 200, tracking the distance and/or face angle of either the pilot trainee or the HMD to the tracking system 200 and/or one or more displays 150, sends data to the computation unit 202, which may then send imagery of the display to the HMD. A representation of the pilot's body (e.g., a hand) may be generated by the computation unit 202 and included on the screen of HMD. In this manner, the screen on the HMD and the one or more displays may share the same imagery. The use of an HMD may allow more than one user (e.g., a pilot and copilot) to use the simulator at the same time while the simulator is in dynamic 3D mode, as the HMD screen and the non-HMD screen may show the same instrument configuration while still allowing the pilot and copilot to each see a field of view of the virtualized instrument panels from their perspective. Accordingly, multiple HMDs may be used for one simulator at one time. It should be known that in some embodiments, the simulator may not comprise an HMD. Therefore, the above description should not be interpreted as a limitation of the present disclosure, but merely as an illustration.

In some embodiments, the one or more displays 105 of the simulator 100 is configured as a head-mounted display. For example, the one or more non-HMD displays may be turned off, or a flat surface substituted in for the one or more non-HMD displays. The tracker system and computing unit may still use the one or more non-HMD displays or one or more substituted flat surfaces to determine the relative position of a pilot trainee 500 (e.g., or a part of the pilot trainee) to the one or more non-HMD displays or one or more substituted flat surfaces. The resulting images of the one or more virtual instrument panels are then displayed on the HMD. It should be known that in some embodiments, the simulator may not be configured as an HMD. Therefore, the above description should not be interpreted as a limitation of the present disclosure, but merely as an illustration.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:
1. A simulator comprising:
a display configured to display a 3D simulated environment;
a tracking system configured to track a target, comprising:
a projector configured to illuminate the target;
a sensor configured to obtain a depth image of the target; one or more processors;
a memory communicatively coupled to the one or more processors and having instructions stored upon, which when executed by the one or more processors, cause the one or more processors to determine at least one of a distance of the target or an angle of a face of the target relative the display;
a computing unit communicatively coupled to the display and the tracking system configured to:
send a 3D simulated environment signal to the display; and
perform an adjustment of the 3D simulated environment based on at least one of the distance of the target or the angle of the face of the target relative to the display,
wherein the adjustment of the 3D simulated environment is configured to be an adjustment of a virtualized component within the 3D simulated environment and as a global adjustment, wherein the global adjustment excludes any adjustment of the display of the 3D virtualized component based on at least one of the distance of the target or the angle of the face of the target relative to at least one of the display or tracking system;
wherein the adjustment of the virtualized component is transiently tracked on the display using a mark that follows a path of movement and thereby indicates the movement of the virtualized component, wherein the virtualized component is configured as an instrument, wherein the instrument is configured as a floor instrument, wherein the instrument is configured as a throttle quadrant,
wherein the instrument is configured as an avionic instrument panel,
wherein the display is configured as a touch sensitive display, wherein the instrument is operated via a touch upon the touch sensitive display.

2. The simulator of claim 1, further comprising a haptic device.

3. The simulator of claim 1, further comprising a head-mounted display.

4. The simulator of claim 1, wherein the sensor further comprises an infrared camera.

5. The simulator of claim 1, wherein the target comprises a head tracking device.

6. The simulator of claim 1, further comprising a non-virtual instrument.

7. The simulator of claim 1, wherein the display is further configured to present a virtualized window-view of a vehicle.

8. The simulator of claim 1, further comprising a seat.

* * * * *